US010411866B2

(12) United States Patent
Lee et al.

(10) Patent No.: US 10,411,866 B2
(45) Date of Patent: Sep. 10, 2019

(54) METHOD FOR RECEIVING CONTROL INFORMATION IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Suckchel Yang, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 15/529,964

(22) PCT Filed: Nov. 19, 2015

(86) PCT No.: PCT/KR2015/012453
§ 371 (c)(1),
(2) Date: May 25, 2017

(87) PCT Pub. No.: WO2016/093508
PCT Pub. Date: Jun. 16, 2016

(65) Prior Publication Data
US 2017/0338932 A1 Nov. 23, 2017

Related U.S. Application Data

(60) Provisional application No. 62/204,949, filed on Aug. 13, 2015, provisional application No. 62/112,668,
(Continued)

(51) Int. Cl.
*H04L 5/00* (2006.01)
*H04W 72/04* (2009.01)

(52) U.S. Cl.
CPC ............ *H04L 5/0055* (2013.01); *H04L 5/001* (2013.01); *H04L 5/0092* (2013.01); *H04W 72/042* (2013.01); *H04W 72/0453* (2013.01)

(58) Field of Classification Search
CPC ...... H04L 5/0055; H04L 5/0092; H04L 5/001
See application file for complete search history.

(56) References Cited

U.S. PATENT DOCUMENTS

2008/0080560 A1* 4/2008 Inoue .................... H04L 1/1671
370/491
2013/0003692 A1 1/2013 Nishio et al.
2016/0100382 A1* 4/2016 He ...................... H04W 72/042
370/329

FOREIGN PATENT DOCUMENTS

KR 1020110084962 7/2011
KR 1020120017412 2/2012
(Continued)

OTHER PUBLICATIONS

PCT International Application No. PCT/KR2015/012453, Written Opinion of the International Searching Authority dated Mar. 18, 2016, 21 pages.

*Primary Examiner* — Jeffrey M Rutkowski
*Assistant Examiner* — Chae S Lee
(74) *Attorney, Agent, or Firm* — Lee Hong Degerman Kang Waimey

(57) ABSTRACT

Disclosed is a method for receiving, by a terminal which has been assigned multiple component carrier groups, control information in a wireless communication system, the method comprising the steps of: receiving control information for the multiple component carrier groups; and receiving data information via component carriers that belong to the multiple component carrier groups using the received control information, wherein the control information may comprise multiplex control information for each of the
(Continued)

multiple component carrier groups, or single control information for the component carriers included in each of the multiple component carrier groups.

10 Claims, 10 Drawing Sheets

Related U.S. Application Data filed on Feb. 6, 2015, provisional application No. 62/089,152, filed on Dec. 8, 2014.

(56) References Cited

FOREIGN PATENT DOCUMENTS

| | | |
|---|---|---|
| KR | 1020120047235 | 5/2012 |
| WO | 2012150762 | 11/2012 |

* cited by examiner

METHOD FOR RECEIVING CONTROL INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2015/012453, filed on Nov. 19, 2015, which claims the benefit of U.S. Provisional Application No. 62/089,152, filed on Dec. 8, 2014, 62/112,668, filed on Feb. 6, 2015, and 62/204,949, filed on Aug. 13, 2015, the contents of which are all hereby incorporated by reference herein in their entirety.

TECHNICAL FIELD

The present invention relates to a wireless communication system, and more particularly, to a method for receiving control information for a plurality of component carriers or a plurality of component carrier groups in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide control information for a plurality of component carriers or a plurality of component carrier groups in a wireless communication system and an operation related to the control information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

A method for receiving, by a terminal which has been configured with a plurality of component carrier groups, control information in a wireless communication system according to one embodiment of the present invention comprises the steps of receiving control information for the plurality of component carrier groups; and receiving data information through component carriers belonging to the plurality of component carrier groups using the received control information, wherein the control information includes multi-control information for each of the plurality of component carrier groups, or single control information for component carriers included in each of the plurality of component carrier groups.

Additionally or alternatively, the single control information may include at least one of transmission mode-dedicated single control information and transmission mode-common single control information of the terminal.

Additionally or alternatively, the multi-control information may include only resource allocation information for one component carrier belonging to a corresponding component carrier group if all component carriers belonging to the corresponding component carrier group have the same bandwidth, and resource allocation information for the other component carriers belonging to the corresponding component carrier group may be the same as that included in the multi-control information.

Additionally or alternatively, the multi-control information may include information indicating one of predetermined resource allocation patterns if all component carriers belonging to a corresponding component carrier group have the same bandwidth.

Additionally or alternatively, the multi-control information may include resource allocation information for one or more component carriers if all component carriers belonging to a corresponding component carrier group have the same bandwidth, and the other component carriers belonging to the corresponding component carrier group may be allocated with the entire of the bandwidth.

Additionally or alternatively, the multi-control information may include resource allocation information for component carriers belonging to a corresponding component carrier group if all component carriers belonging to the corresponding component carrier group have the same bandwidth and the entire of the bandwidth is not allocated.

Additionally or alternatively, the multi-control information may include resource allocation information for a component carrier allocated with the greatest bandwidth among all component carriers belonging to a corresponding component carrier group if all the component carriers belonging to the corresponding component carrier group do not have the same bandwidth, and resource allocation information for the other component carriers belonging to the corresponding component carrier group may be determined using the resource allocation information of the component carrier allocated with the greatest bandwidth.

Additionally or alternatively, resource allocation for the component carriers belonging to the corresponding component carrier group may be performed depending on different resource allocation types.

Additionally or alternatively, the multi-control information may include information indicating which component carrier within the component carrier group is a target scheduled by the multi-control information.

Additionally or alternatively, the method may further comprise bundling for ACK/NACK bits for the data information received through component carriers belonging to the plurality of component carrier groups and transmitting the bundled ACK/NACK bits through a specific resource, wherein the specific resource may be related to an index of one of the component carriers which are targets scheduled by the control information within the plurality of component carrier groups.

A terminal configured to receive control information in a wireless communication system according to another embodiment of the present invention, the terminal being configured with a plurality of component carrier groups, and comprising a radio frequency (RF) unit; and a processor configured to control the RF unit, wherein the processor is configured to receive control information for the plurality of component carrier groups and receive data information through component carriers belonging to the plurality of component carrier groups using the received control information, and the control information includes multi-control information for each of the plurality of component carrier groups, or single control information for component carriers included in each of the plurality of component carrier groups.

Additionally or alternatively, the single control information may include at least one of transmission mode-dedicated single control information and transmission mode-common single control information of the terminal.

Additionally or alternatively, the multi-control information may include only resource allocation information for one component carrier belonging to a corresponding component carrier group if all component carriers belonging to the corresponding component carrier group have the same bandwidth, and resource allocation information for the other component carriers belonging to the corresponding component carrier group may be the same as that included in the multi-control information.

Additionally or alternatively, the multi-control information may include information indicating one of predetermined resource allocation patterns if all component carriers belonging to a corresponding component carrier group have the same bandwidth.

Additionally or alternatively, the multi-control information may include resource allocation information for one or more component carriers if all component carriers belonging to a corresponding component carrier group have the same bandwidth, and the other component carriers belonging to the corresponding component carrier group may be allocated with the entire of the bandwidth.

Additionally or alternatively, the multi-control information may include resource allocation information for component carriers belonging to a corresponding component carrier group if all component carriers belonging to the corresponding component carrier group have the same bandwidth and the entire of the bandwidth is not allocated.

Additionally or alternatively, the multi-control information may include resource allocation information for a component carrier allocated with the greatest bandwidth among all component carriers belonging to a corresponding component carrier group if all the component carriers belonging to the corresponding component carrier group do not have the same bandwidth, and resource allocation information for the other component carriers belonging to the corresponding component carrier group may be determined using the resource allocation information of the component carrier allocated with the greatest bandwidth.

Additionally or alternatively, resource allocation for the component carriers belonging to the corresponding component carrier group may be performed depending on different resource allocation types.

Additionally or alternatively, the multi-control information may include information indicating which component carrier within the component carrier group is a target scheduled by the multi-control information.

Additionally or alternatively, the processor may be configured to perform bundling for ACK/NACK bits for the data information received through component carriers belonging to the plurality of component carrier groups and transmit the bundled ACK/NACK bits through a specific resource, wherein the specific resource may be related to an index of any one of the component carriers which are targets scheduled by the control information within the plurality of component carrier groups.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, scheduling for a plurality of component carriers or a plurality of component carrier groups may efficiently be performed in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
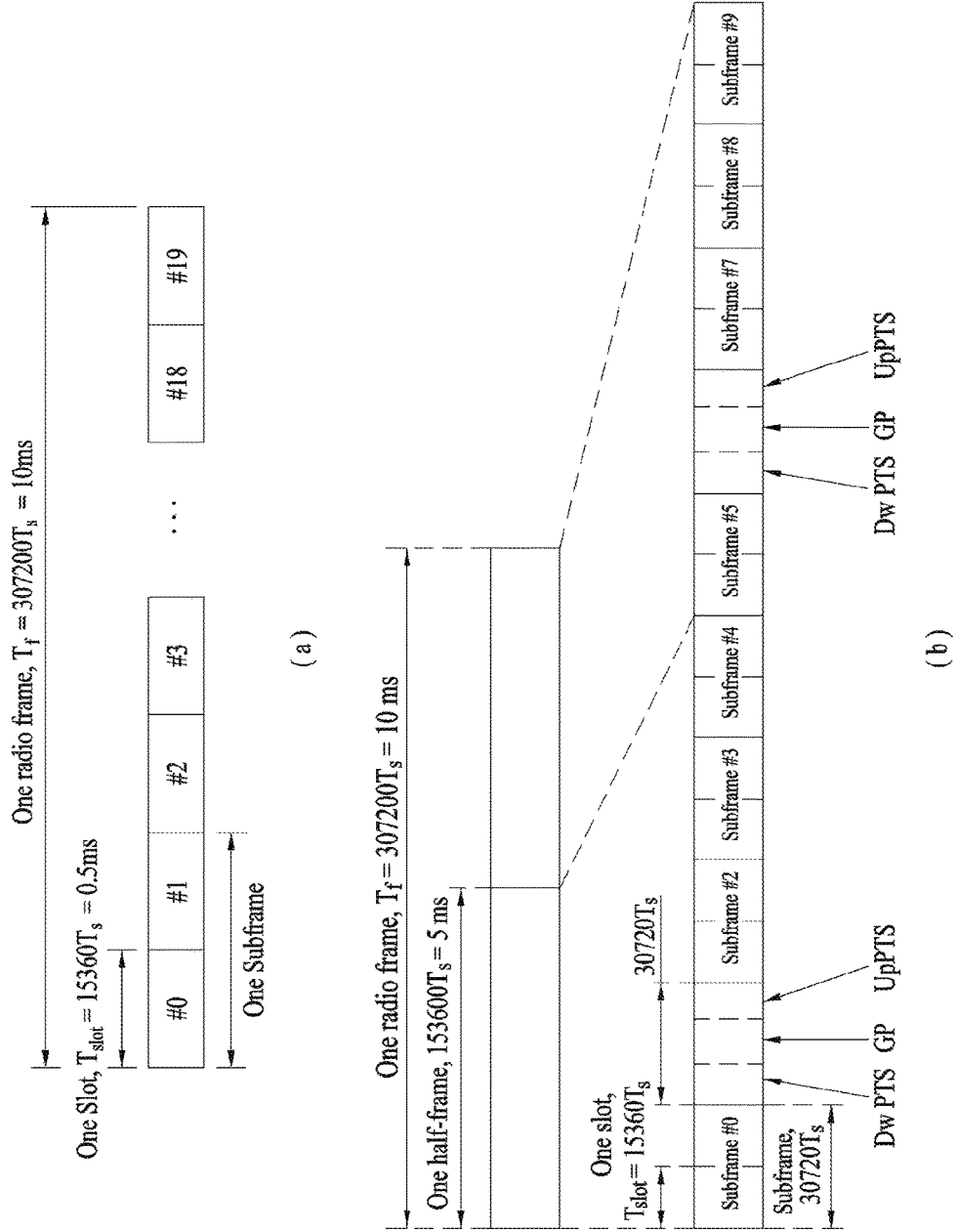
FIG. 1 is diagram illustrating an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled by an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx)

nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
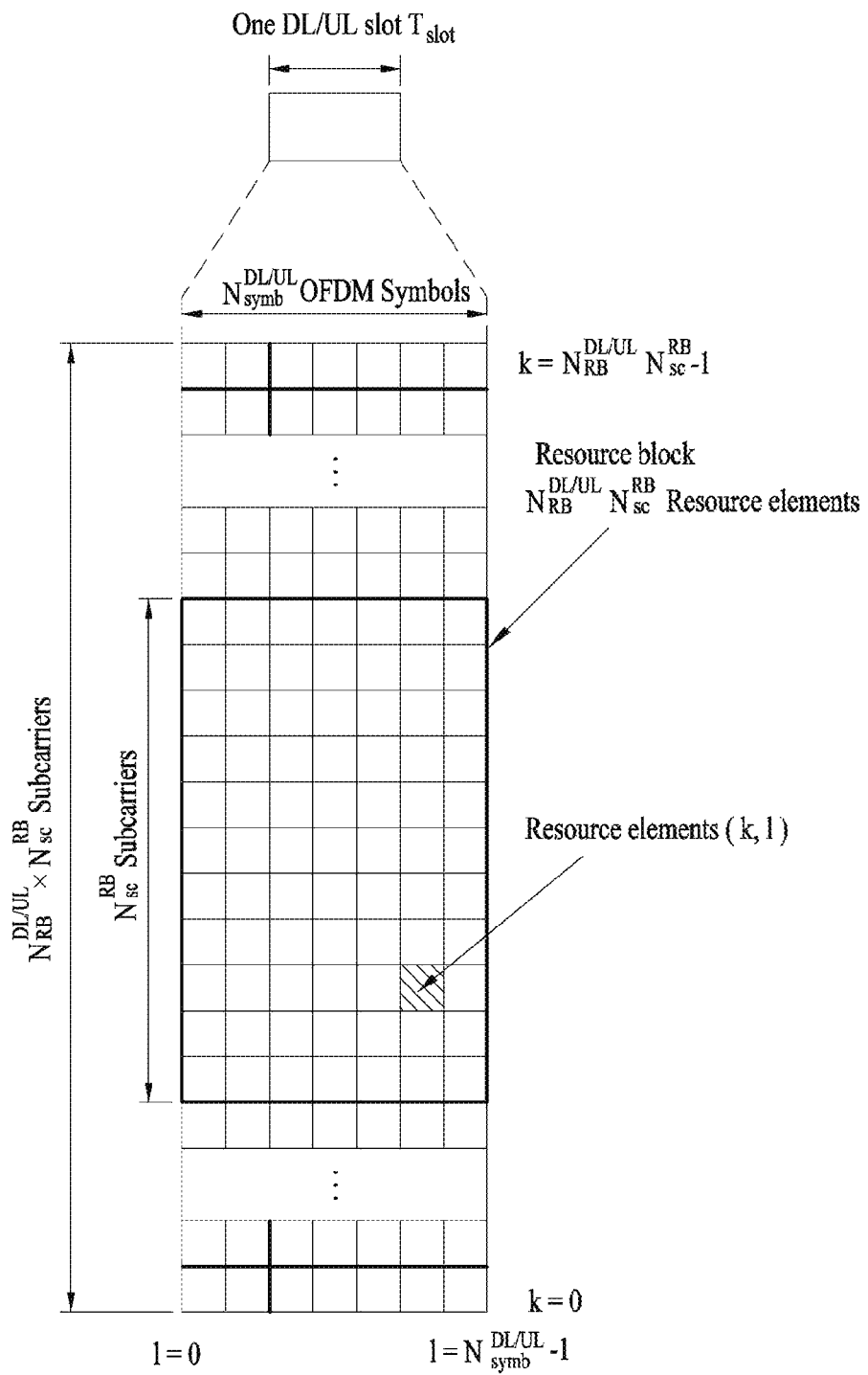
FIG. 2 is diagram illustrating an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/ULL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
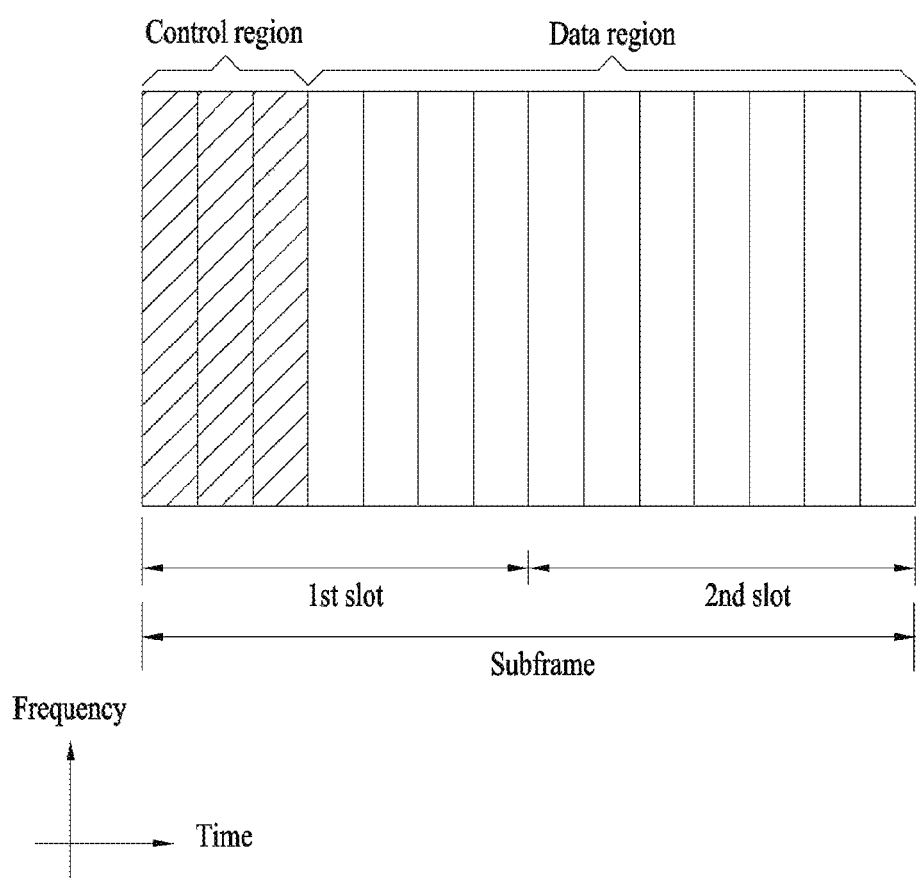
FIG. 3 is diagram illustrating an example of a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A"

detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
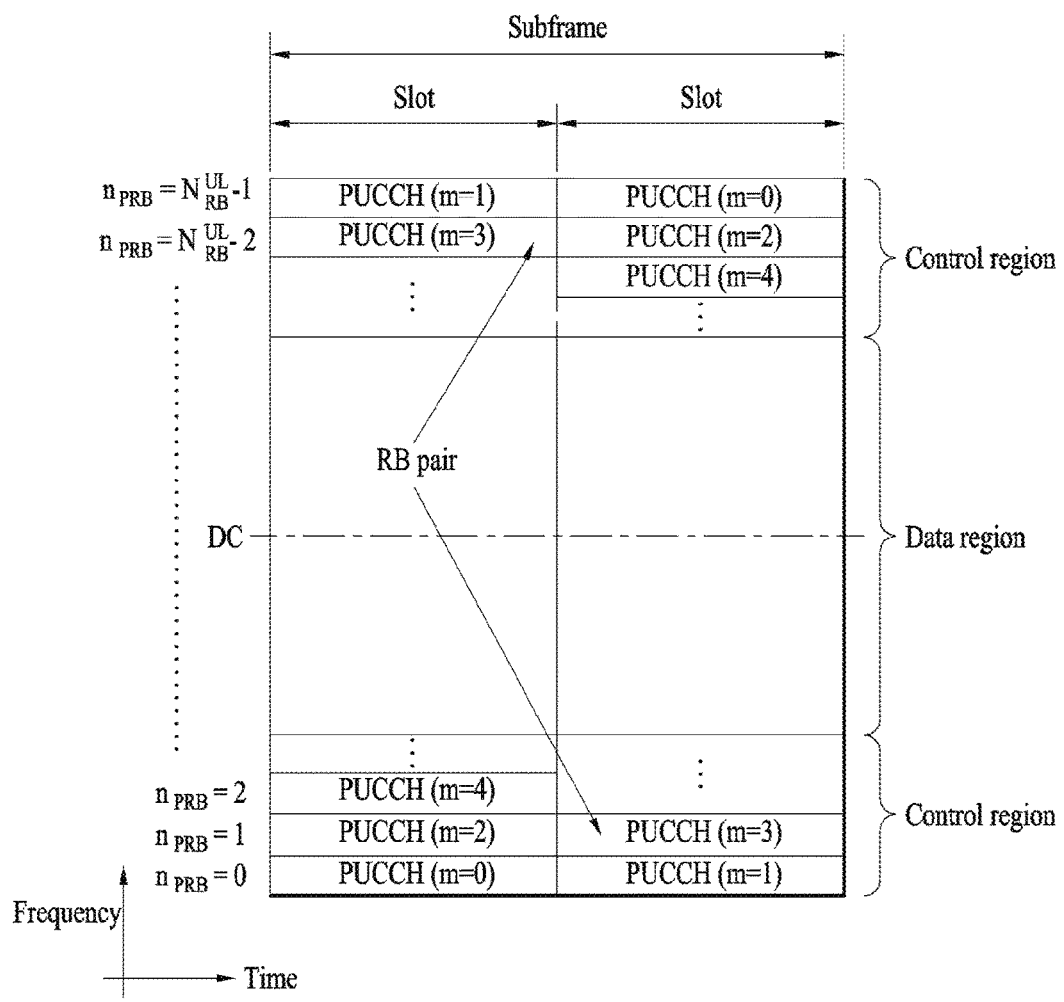
FIG. 4 is diagram illustrating an example of an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In a wireless cellular communication system, one eNB controls data transmission and reception for a plurality of UEs, and scheduling information on downlink data, for example, time/frequency information for data transmission and MCS (modulation and coding scheme) and HARQ (hybrid automatic retransmission request) related information are transmitted to a corresponding UE to allow the UE to receive data. Similarly, the eNB notifies the corresponding UE of uplink scheduling information to allow the UE to transmit uplink data. Recently, CA (carrier aggregation) for transmitting downlink data to a single UE by aggregating unit component carrier (CC) has been considered to support a wider bandwidth while using band identification of the related art. Particularly, in the LTE standard, self-carrier scheduling and cross-carrier scheduling have been considered. In the self-carrier scheduling, each cell transmits a control channel having scheduling information in a state that a plurality of CC (component carriers) of different duplex modes or the same duplex mode are aggregated. In the cross-carrier scheduling, one cell transmits a control channel having scheduling information of another cell. In the current LTE standard, CA for transmitting downlink data by aggregating 5 CCs has been considered. However, CA enhancement for transmitting downlink data by aggregating 5 or more CCs (for example, 16 CCs) is recently considered to support traffic load which is rapidly increased. If DCI for each CC which is scheduled is transmitted, signaling overhead of a control channel, which includes control information on CCs which are simultaneously scheduled, is increased proportionally as the number of the CCs is increased. Also, blind detection complexity of a UE for decoding the control channel is also increased.

In this specification, in a state that a plurality of CC (component carriers) of different duplex modes or the same duplex mode are aggregated, a method for signaling control information to a UE to reduce signaling overhead and lower complexity of control information blind detection of the UE and a UE operation corresponding to the method will be suggested. Particularly, when an eNB schedules a CC group comprised of a plurality of CCs to a UE in a CA environment using one type of control information at once, a method for signaling the corresponding control information to the UE and a UE operation corresponding to the method will be suggested. In addition, a method for mapping what kind of a CC group into each control information will be suggested. In this specification, CC may include a cell.

Scheme for Indicating CC Group in Multi-CC Scheduling

First of all, CC groups which may be scheduled (that is, multi-CC scheduling) from one type of control information/channel at the same time may previously be configured through a higher layer signal (e.g., RRC signaling). In this case, corresponding control information/channel for performing multi-CC scheduling will be referred to as "mCC-DCI" for convenience. Therefore, mCC-DCI for scheduling each CC group may be transmitted per CC group. In more detail, the following schemes may be considered:

whether a CC within a CC group is an actual mCC-DCI based scheduling target may be indicated directly within the corresponding mCC-DCI;

a scheme in which all CCs within the CC group are always corresponding mCC-DCI based scheduling targets without separate indication may be considered; or CCs which are actual mCC-DCI based scheduling targets among all CCs may be indicated dynamically within the corresponding mCC-DCI without previous configuration for CC group.

Scheme for Configuring CC Group in Multi-CC Scheduling

If mCC-DCI for multi-CC scheduling is transmitted to a UE, a CC group may be configured by CCs the same as or similar to one another for all or some of the followings.

Bandwidth: a CC group may be configured by CCs having the same bandwidth, whereby a resource allocation field may easily be configured if scheduling is performed using one mCC-DCI.

TM: a CC group may be configured by CCs having the same transmission mode, whereby mCC-DCI may be generated easily as the same DCI format is used if scheduling is performed using one mCC-DCI.

CP (cyclic prefix) type (normal CP or extended CP).

Duplex mode (FDD or TDD).

Special subframe configuration

Scheme for Transmitting PDCCH in Multi-CC Scheduling

When the eNB transmits mCC-DCI for multi-CC scheduling to the UE, the following methods will be suggested. The PDCCH mentioned in this specification may mean or include EPDCCH which is a control channel type transmitted through a PDSCH region not the legacy PDCCH.

The eNB transmits mCC-DCI to each CC group. That is, each mCC-DCI includes scheduling information on CC within one CC group. CC which will be scheduled may be indicated using a bitmap within mCC-DCI, or all CCs within a CC group may always be scheduled without a separate bitmap.

A multi-CC scheduling scheme may be used based on mCC-DCI transmission with respect to one CC group grouped by a primary CC (that is, PCC) and a plurality of secondary CCs (that is, SCC). Alternatively, a single CC scheduling scheme based on individual DCI transmission may be applied to the primary CC (that is, PCC) like the related art, while a multi-CC scheduling scheme may be applied to the secondary CCs (that is, SCC) on the basis of mCC-DCI of the CC group unit. Otherwise, a single CC scheduling scheme may be applied to specific some of all CCs (including PCC), while a multi-CC scheduling scheme may be applied to the other CCs.

Alternatively, the eNB transmits one mCC-DCI to all CCs. (Only one CC group exists and includes all CCs. This corresponds to the above special case.) In this case, signaling overhead of the PDCCH may be reduced significantly, whereas scheduling restriction of the eNB may be intensified.

Scheme for Indicating Resource Allocation in Multi-CC Scheduling

If a control channel, which includes information on resource allocation, is transmitted to each CC, which is a target for scheduling based on actual mCC-DCI within a CC group, in case of multi-CC scheduling, signaling overhead of the control information may be increased. Therefore, if multi-CC scheduling is used, the present invention suggests the following methods.

① Case that all CCs within CC group have the same bandwidth

Resource allocation for one CC may be indicated, and data may be allocated to the same frequency domain (for example, same resource block domain) with respect to the other CCs.

The eNB previously defines some types of resource allocation patterns per bandwidth and previously notifies the UE of the defined resource allocation patterns through a semi-static signal. DCI may include a bitmap indicating a resource allocation pattern which will be scheduled to all CCs within a CC group. Alternatively, a respective resource allocation pattern may be used for each of CCs and bitmaps for the respective resource allocation patterns may be collected to indicate resource allocation.

CCs for multi-CC scheduling may be considered to be always allocated with a full band without a separate resource allocation field. For example, if CC1 and CC2 among three CCs within the same CC group, that is, CC1, CC2 and CC3 are indicated as CCs for scheduling, a full band of each CC may be allocated to the two corresponding CCs. Alternatively, a full band may be scheduled for only some CCs of the CC group, and resource allocation information may additionally be indicated for the other CCs.

If mCC-DCI based scheduling targets are all or a plurality of CC groups, CC groups for multi-CC scheduling may be considered to be always allocated with a full band without a separate resource allocation field. For example, if CC groups 1 and 2 of CC groups 1, 2 and 3 are indicated as targets for mCC-DCI based scheduling, a full band may be allocated to all CCs within the two corresponding CC groups.

② Case that all CCs within CC group do not have the same bandwidth

Figure 5:
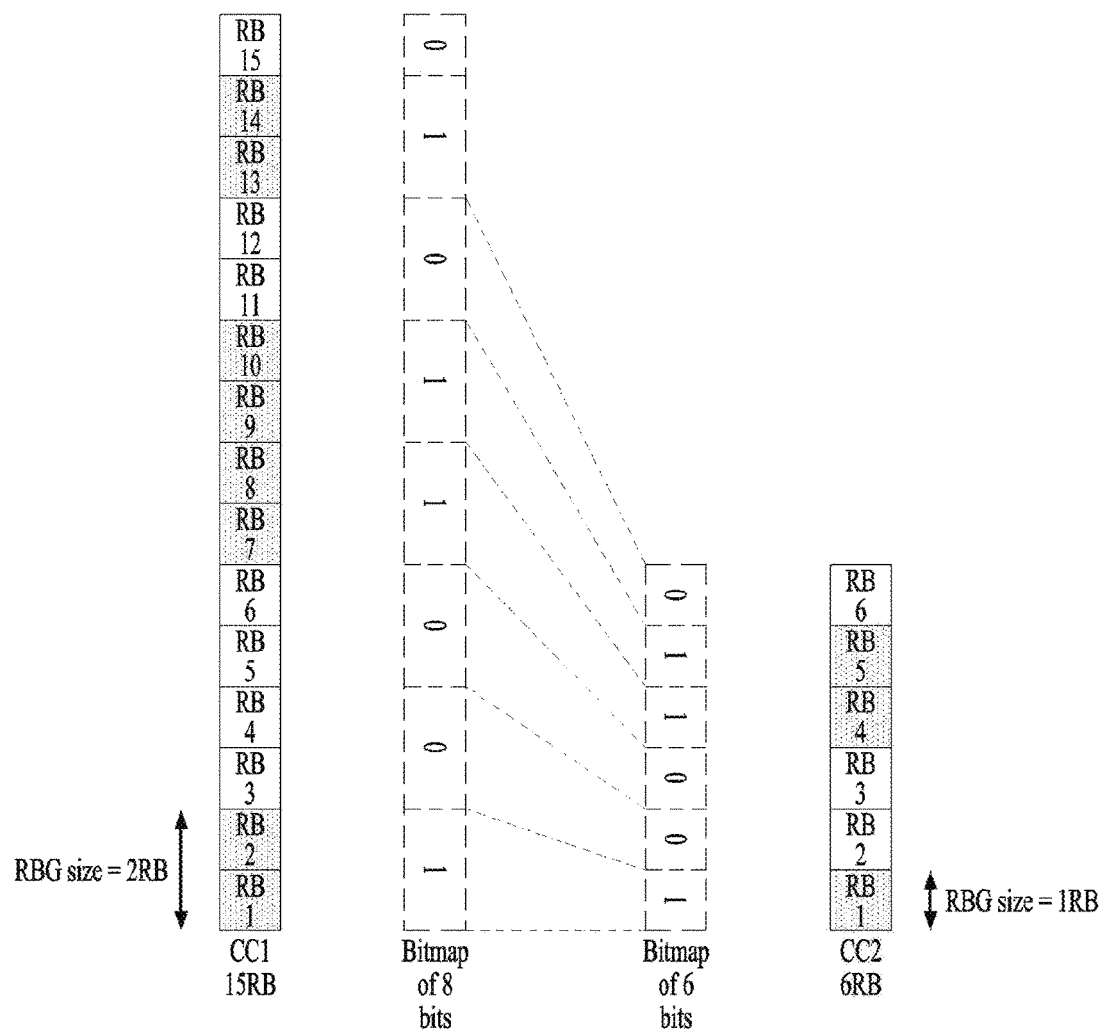
FIG. 5 is a diagram illustrating resource allocation information per component carrier according to one embodiment of the present invention.

If CCs which do not have the same bandwidth are allowed to be grouped into one CC group when the CC group is determined, mCC-DCI may indicate resource allocation for CC having the greatest bandwidth. Resource allocation for CCs having the smaller bandwidths may depend on only some bits corresponding to their bandwidths among bitmaps indicated for the CC having the greatest bandwidth. For example, if a bandwidth of CC1 within one CC group is 3 MHz (15 RBs) and a bandwidth of CC2 is 1.4 MHz (6 RBs) and the eNB uses type 0 resource allocation, resource allocation may be indicated as shown in FIG. 5. That is, if a resource allocation bitmap is "10011010", scheduling is performed for RB indicated by "100110" corresponding to the leftmost 6 bits with respect to CC2. A resource allocation bitmap for CC2 is not limited to the leftmost 6 bits. For another example, scheduling is performed for RB corresponding to the rightmost 6 bits or predetermined 6 bits.

Figure 6:
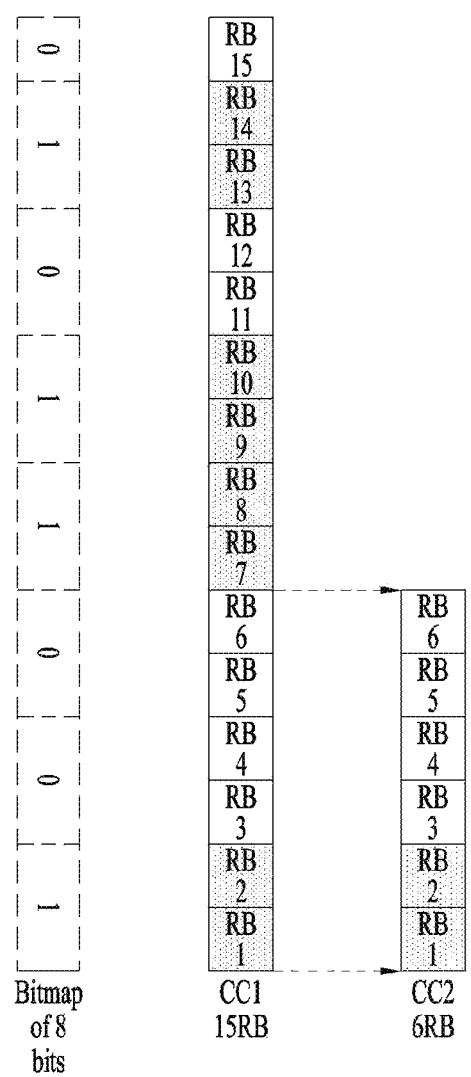
FIG. 6 is a diagram illustrating resource allocation information per component carrier according to one embodiment of the present invention.

If CCs which do not have the same bandwidth are allowed to be grouped into one CC group when the CC group is determined, only resource allocation for CC having the greatest bandwidth may be indicated. With respect to CCs having the smaller bandwidths, some band corresponding to a corresponding frequency bandwidth among frequency bands of the CC having the greatest bandwidth may be selected and then scheduling is performed for RB the same as RB scheduled for the CC having the greatest bandwidth. For example, if a bandwidth of CC1 within one CC group is 3 MHz (15 RBs) and a bandwidth of CC2 is 1.4 MHz (6 RBs) and the eNB uses type 0 resource allocation, resource allocation may be indicated as shown in FIG. 6. That is, if a resource allocation bitmap is "10011010", scheduling is performed for RBs 1, 2, 7, 8, 9, 10, 13 and 14 with respect to CC1. With respect to CC2, some bands (RBs 1 to 6) corresponding to bandwidth of CC2 may be selected and then scheduling may be performed for RBs 1 and 2 of the RBs 1 to 6.

Figure 7:
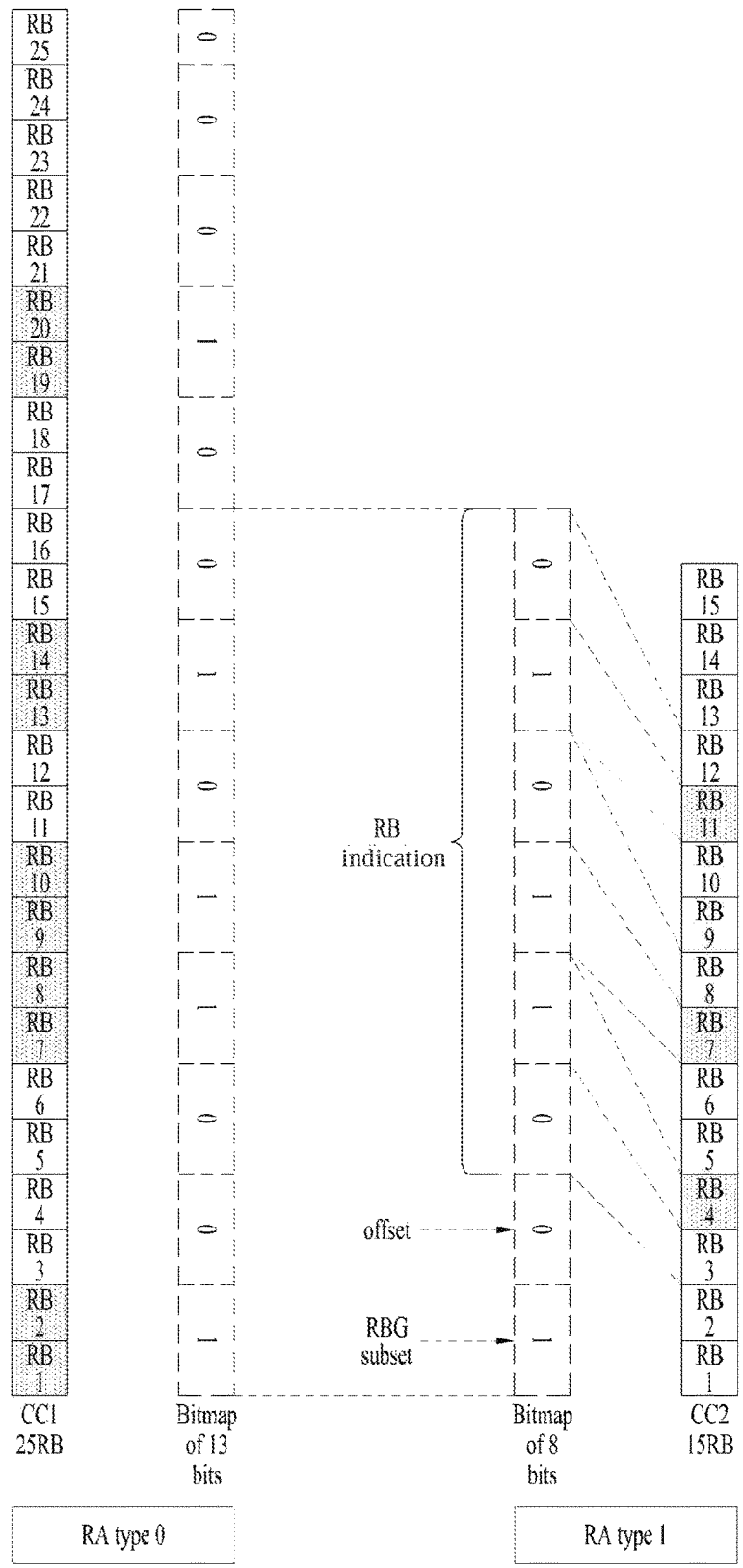
FIG. 7 is a diagram illustrating resource allocation information per component carrier according to one embodiment of the present invention.

If CCs which do not have the same bandwidth are allowed to be grouped into one CC group when the CC group is determined, the eNB may use a separate resource allocation type for each of CCs. In this case, when transmitting resource allocation for each CC, the eNB may signal information on a resource allocation type used for each CC. Resource allocation for CC having the greatest bandwidth may be indicated, and resource allocation for CCs having the smaller bandwidths may depend on only some bits corresponding to their bandwidths among bitmaps indicated for the CC having the greatest bandwidth. At this time, the UE may discover resource allocation of the eNB by interpreting corresponding bits to be matched with a resource allocation type indicated by bits corresponding to resource allocation based on the bandwidth of each CC. For example, if a bandwidth of CC1 within one CC group is 5 MHz (25 RBs) and a bandwidth of CC2 is 3 MHz (15 RBs) and resource allocation types 0 and 1 are respectively applied to CC1 and CC2, resource allocation may be indicated as shown in FIG. 7. That is, if a resource allocation bitmap is "10011010", scheduling is performed for RBs 1, 2, 7, 8, 9, 10, 13 and 14 with respect to CC1. With respect to CC2, scheduling is performed for RBs 4, 7 and 11.

Considering complexity, it may be restricted that only localized virtual RB (LVRB) may be used for all CCs within each CC group (or within all CC groups) or the same resource allocation type is only used in case of multi-CC scheduling.

If CCs which do not have the same bandwidth are allowed to be grouped into one CC group when the CC group is determined, and if CCs within the CC group correspond to distributed resource allocation, a predetermined value per bandwidth is used as a gap value, and this gap value is notified to the UE through a semi-static signal. Alternatively, the gap value is dynamically notified to the UE by 1 bit indication, whereby scheduling is performed. This gap value is disregarded in CC of a bandwidth, which always uses only one gap value.

③ Case that bandwidth of CC within CC group is not the same as TM

Bits used for resource allocation indication are determined by TM and bandwidth. If a bandwidth of CC within CC group is not the same as TM, resource allocation may be indicated for CC which uses a bitmap having the longest length, and resource allocation may be indicated for the other CCs by using only a bit length corresponding to TM and bandwidth among bitmaps of the longest length.

Scheme for Indicating MCS in Multi-CC Scheduling

In case of multi-CC scheduling, schemes for indicating MCS will be suggested as follows.

① One MCS per CC group is indicated.
② Each MCS per CC within CC group is indicated.
③ Only for CC/cell which is a target for actual scheduling based on mCC-DCI, MCS is indicated for each TB per CC for scheduling.
④ MCS is indicated per CC group or CC in accordance with the above suggestions, and an offset scheme is used.

A reference CC group or CC is determined, and then a difference between the reference CC group or CC and MCS is indicated by offset.

MCS for a specific TB within CC is indicated, and MCS for the other TBs is indicated by offset.

DCI Format 1A in Multi-CC Scheduling

If some CC groups or CCs are subjected to fallback under multi-CC scheduling, DCI transmission therefor will be suggested as follows. In this case, fallback means that TM-common DCI (for example, DCI format 1A0 based scheduling is performed if it is determined that TM configured for the UE is not suitable and thus the eNB should reconfigure TM, or if a channel state is not suitable for multi-rank/multi-layer transmission.

① If fallback is applied to a specific CC group or CC, individual DCI is generated and then transmitted to the corresponding CC group or CC.
② If fallback is applied to a specific CC group or CC, scheduling is not performed for the corresponding CC group or CC.

Aperiodic CSI Report Triggering in Multi-CC Scheduling

The eNB may trigger aperiodic CSI (channel state information) report to receive reporting of channel information on all or some of CC groups or CCs from the UE at a specific time. In case of multi-CC scheduling, aperiodic CSI triggering will be suggested as follows.

① Triggering of aperiodic CSI report per CC group may be indicated using a legacy 2-bit field. At this time, for example, indication may be performed as listed in the following Table. Similarly, a set per CC may previously be designated and then triggering of aperiodic CSI report per CC may be indicated.

TABLE 5

| Bit field | Detailed description |
|---|---|
| 00 | No aperiodic CSI report is triggered. |
| 01 | Aperiodic CSI report is triggered for all CC groups. |
| 10 | Aperiodic CSI report is triggered for a first set of CC groups configured by higher layers. |
| 11 | Aperiodic CSI report is triggered for a second set of CC groups configured by higher layers. |

② Triggering of aperiodic CSI report may be indicated individually for each CC group. That is, an aperiodic CSI triggering bit field for each CC group may be given.

③ Or, triggering of aperiodic CSI report may be indicated for each CC.

HARQ (Hybrid Automatic Repeat Request) Process in Multi-CC Scheduling

In case of multi-CC scheduling, one HARQ number is given to each mCC-DCI. If mCC-DCI is transmitted in a unit of CC group, the HARQ number is commonly applied to all scheduled CCs within the CC group. Alternatively, HARQ number may be indicated for only CC/cell for actual scheduling based on mCC-DCI. Also, the following HARQ process will be suggested in accordance with scheduling.

① Scheme 1: (for one CC group) multi-CC scheduling is applied to both initial transmission and retransmission.

- One NDI/RV is commonly indicated for CC (or a plurality of CCs) within CC group corresponding to multi-CC scheduling, or a separate NDI/RV is indicated for each CC.
- NDI is commonly indicated for CC (or a plurality of CCs) within CC group, and a separate RV is indicated for each CC. Alternatively, RV is commonly indicated for CC (or a plurality of CCs) within CC group, and a separate NDI is indicated for each CC.

② Scheme 2: multi-CC scheduling is applied to only initial transmission while single-CC scheduling is applied to retransmission.

- NDI and RV are omitted within DCI for multi-CC scheduling. At this time, RV may be fixed to 0 or a predetermined value.

Scheme for Indicating NDI/RV in Multi-CC Scheduling

In case of multi-CC scheduling, indication of NDI (new data indicator) and RV (redundancy version) which should be indicated in a unit of TB (transport block) will be suggested as follows.

① If one TB is allocated to one CC, NDI/RV may respectively be indicated for each CC.

② If one TB is allocated to a plurality of CCs and one TB is allocated to a CC group, NDI/RV may respectively be indicated for each CC group.

③ If a plurality of TBs are allocated to one CC, NDI/RV may be indicated in a unit of TB.

At this time, indication of NDI/RV may be limited to CC/cell for actual scheduling based on mCC-DCI.

Retransmission in Multi-CC Scheduling

In case of multi-CC scheduling, retransmission of some CC groups or CCs will be suggested as follows, if necessary.

① If one TB is allocated to one CC, retransmission may be configured for each CC.

② If one TB is allocated to a plurality of CCs, retransmission may be configured for each CC group.

③ If a plurality of TBs are allocated to one CC, retransmission may be configured in a unit of TB.

Blind Detection in Multi-CC Scheduling

There is a limitation in the number of times of blind detection (BD), which may be performed by the UE to decode a control channel. If a UE which may be allocated with downlink scheduling for "Nc" number of CCs is capable of performing BD of maximum 'N' times within one subframe, the followings will be suggested. In this case, it is considered that "Nc" is greater than "N". (If "Nc" is smaller than "N", even though a control channel is transmitted to each CC, the UE may perform BD for all CCs.)

① Scheme 1: "Nc" number of CCs may be divided into "N" number of CC groups every subframe, whereby scheduling may be performed for the CC groups at one time. That is, "N" number of DCIs corresponding to each CC group may be transmitted at one subframe, whereby the UE performs BD of "N" times per subframe. In this case, DCI may include the mCC-DCI if a corresponding CC group includes a plurality of CCs, and may include single-CC scheduling DCI of the related art if the corresponding CC group includes only one CC.

Figure 8:
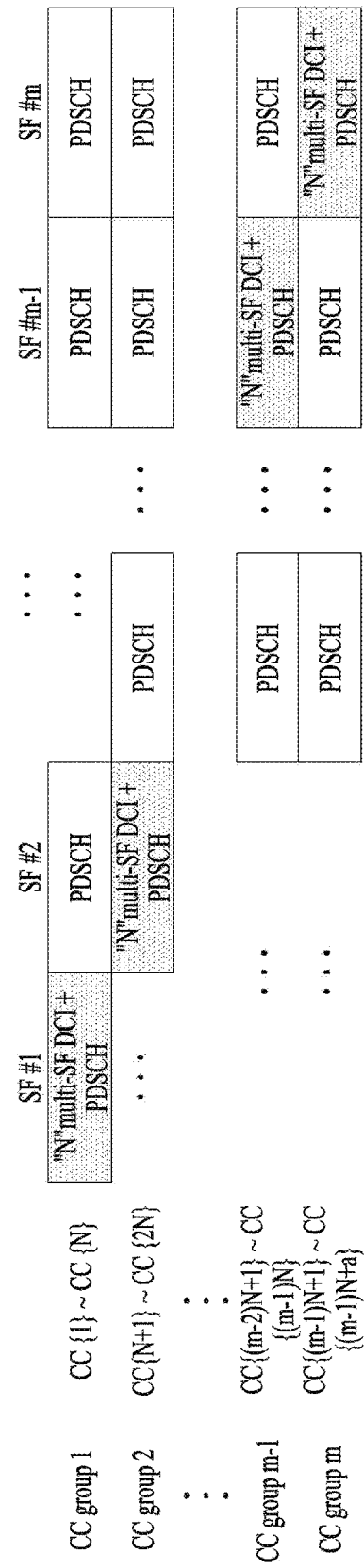
FIG. 8 is a diagram illustrating a reception or transmission timing point of control information per component carrier group and data information associated with the control information according to one embodiment of the present invention.

② Scheme 2: If "Nc" number of CCs are divided into "m" number of CC groups, "Nc=(m−1)N+a" may be expressed. In this case, "N" is the number of CCs per group from CC group 1 to CC group m−1, "a" is an integer between 1 and N. In this scheme, CC group means CCs, which may simultaneously be scheduled at the same time, not multi-CC scheduling targets (that is, multi-CC scheduling is not applied to the scheme 2). With respect to "N" number of CCs corresponding to each CC group, "m" number of subframes are transmitted at one time, that is, "N" number of multi-subframe DCIs for performing multi-subframe scheduling are transmitted at one subframe. At this time, the multi-subframe DCIs are transmitted at subframes different per CC group as shown in FIG. 8. In this case, the UE performs BD of "N" times per subframe. For example, in case of Nc=17 and N=4, CCs are divided into a total of m=5 CC groups, whereby DCI for CCs respectively corresponding to CC groups 1, 2, 3, 4 and 5 is transmitted at subframes k+1, k+2, k+3, k+4, and k+5. The UE performs BD of N=4 times to decode DCI of CCs within a corresponding CC group at each subframe. At the subframe k+5, the UE performs BD of one time for the CC group 5.

Search Space in Multi-CC Scheduling

Figure 9:
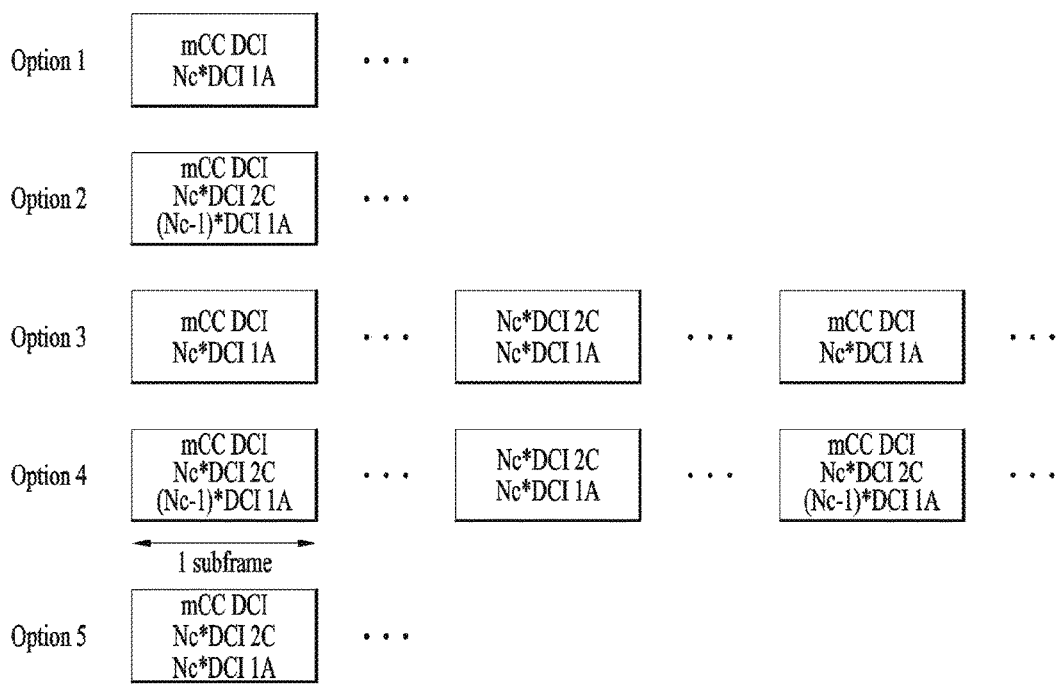
FIG. 9 is a diagram illustrating control information for a plurality of component carriers or a plurality of component carrier groups according to one embodiment of the present invention.

In case of multi-CC scheduling, PDCCH search space candidates of the UE may be defined as shown in FIG. 9. In this case, "Nc" means the number of scheduled CCs (or CC groups), and mCC-DCI means one DCI that includes all kinds of control information on "Nc" number of CCs (or CC groups). Alternatively, in a more general sense, mCC-DCI may mean one type of DCI that includes control information of a plurality of scheduling target CCs/cells.

Each option will be described in more detail (this may mean DCI that should be detected or may be detected at one subframe in view of the UE).

① Option 1: only one mCC-DCI may be configured/applied to TM-dedicated DCI transmission to a plurality of scheduling target CCs/cells, and single-CC DCI per CC may be configured/applied to TM-common DCI transmission.

② Option 2: one mCC-DCI and single-CC DCI per CC may be configured/applied to TM-dedicated DCI transmission to a plurality of scheduling target CCs/cells, and single-CC DCI per CC may be configured/applied to TM-common DCI transmission, wherein TM-common (or TM-dedicated) DCI based scheduling may not be supported for a specific CC to prevent BD times from being increased.

③ Option 3: time duration may be divided, whereby the option 1 may be applied to a specific time duration and the legacy single-CC DCI based scheduling may be applied to the other specific time duration. That is, time division modulation (TDM) between the legacy single-CC DCI based scheduling and the option 1 may be applied. Therefore, a subframe for mCC-DCI detection may be designated previously.

④ Option 4: time duration may be divided, whereby the option 2 may be applied to a specific time duration and the legacy single-CC DCI based scheduling may be applied to the other specific time duration (that is, TDM between the option 2 and the legacy scheme). Therefore, a subframe for mCC-DCI detection may be designated previously.

⑤ Option 5: one mCC-DCI and single-CC DCI per CC are configured/applied to TM-dedicated DCI transmission to a plurality of scheduling target CCs/cells, and single-CC DCI per CC is configured/applied to TM-common DCI transmission.

Scheme for Indicating DMRS Port & nSCID & the Number of Layers in Multi-CC Scheduling In case of multi-CC scheduling, DCI of a UE of a TM 9 or 10 includes a field related to antenna port, nSCID and the number of layers and then is transmitted. A scheme for indicating the field will be suggested as follows.

① Only one value is indicated for all CCs which are scheduled, and is commonly applied to the CCs.

② Only one value is indicated for each CC which is an actual mCC-DCI based scheduling target, and is commonly applied to each CC.

③ A value is indicated for each CC for only CCs/cells which are actual scheduling targets based on mCC-DCI.

Scheme for Indicating TPC/ARI/DAI

If multi-CC scheduling is performed for a CC group (or a plurality of CC groups) grouped by a primary CC (that is, PCC) and a plurality of secondary CCs (that is, SCCs) by using one mCC-DCI, a scheme for indicating TPC/ARI/DAI will be suggested as follows.

① If PCC or PSCC (primary secondary component carrier) is included in an mCC-DCI based scheduling target, signaling is performed in such a manner that TPC and ARI are included in the corresponding mCC-DCI. In this case, the PSCC may indicate a secondary CC for performing PUCCH transmission.

② If PCC or PSCC is not included in an mCC-DCI based scheduling target, only ARI is signaled to the corresponding mCC-DCI.

③ If PCC is configured so as not to be included in an mCC-DCI based scheduling target, the PCC is subjected to single-CC scheduling. Similarly, if PSCC is configured so as not to be included in an mCC-DCI based scheduling target, the PSCC is subjected to single-CC scheduling.

④ Only one DAI is commonly signaled to all CCs which are mCC-DCI based scheduling targets.

⑤ A separate DAI is signaled to each CC which is mCC-DCI based scheduling target.

HARQ-ACK Feedback

A rule may be defined such that HARQ-ACK (spatial) bundling is applied to PDSCHs related to (some or all) CCs scheduled through one mCC-DCI. In this case, for example, when corresponding HARQ-ACK (spatial) bundled A/N (ACK/NACK) bits are transmitted on PUCCH (and/or PUSCH), a rule may be defined such that transmission of the corresponding bundled A/N bits is mapped into previously defined (or signaled) specific scheduled cell (or CC) index (for example, the lowest or the highest index) related HARQ-ACK resource among CCs for mCC-DCI or previously defined or signaled specific cell (or CC) index (for example, the lowest or the highest index) related HARQ-ACK resource.

Aggregation Level of mCC-DCI

To control complexity of blind detection for mCC-DCI, candidates of an aggregation level that may be applied to mCC-DCI may be configured differently or independently from the legacy single-CC DCI.

The candidates of the aggregation level may be configured differently depending on a bandwidth of CCs/cells to which (E)PDCCH including mCC-DCI will be transmitted. Alternatively, the candidates of the aggregation level may be configured differently depending on the number of CCs/cells scheduled by mCC-DCI. Otherwise, the candidates of the aggregation level may be configured differently depending on the case that mCC-DCI is mapped into a common search space and the case that mCC-DCI is mapped into a UE-specific search space.

The candidates of the aggregation level, which may be applied to mCC-DCI, may be configured by combination of some of the above rules.

Figure 10:
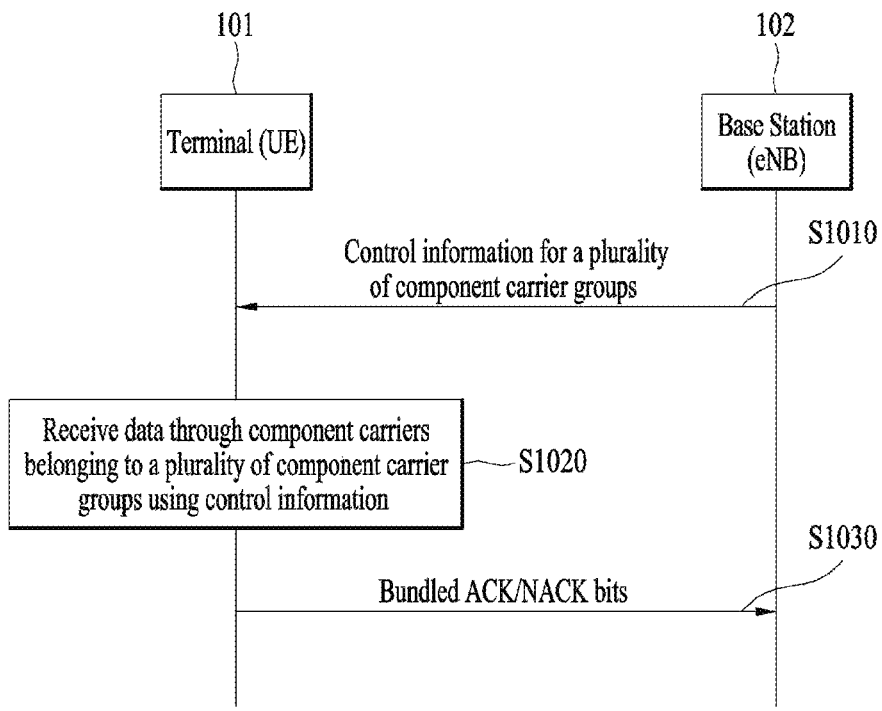
FIG. 10 is a diagram illustrating an operation according to one embodiment of the present invention.

FIG. 10 is a diagram illustrating an operation according to one embodiment of the present invention.

FIG. 10 illustrates that a wireless communication system receives control information on a plurality of component carrier groups or a plurality of components carriers and receives data information from a corresponding component carrier or component carrier group by using the received control information.

The UE 101 may receive control information for the plurality of component carrier groups from the eNB 102 (S1010). The UE may receive data information through the component carriers belonging to the plurality of component carrier groups by using the received control information (S1020).

The control information may include multi-control information for each of the plurality of component carrier groups and single control information for component carriers included in each of the plurality of component carrier groups.

The single control information may include at least one of transmission mode-dedicated single control information and transmission mode-common single control information of the UE.

Also, the multi-control information may include only resource allocation information for one component carrier if all the component carriers belonging to the corresponding component carrier group have the same bandwidth, and resource allocation information for the other component carriers may be the same as that included in the multi-control information.

The multi-control information may include information indicating one of predetermined resource allocation patterns if all the component carriers belonging to the corresponding component carrier group have the same bandwidth.

The multi-control information may include resource allocation information for one or more component carriers if all the component carriers belonging to the corresponding component carrier group have the same bandwidth, and the other component carriers may be allocated with the entire of the bandwidth.

The multi-control information may include resource allocation information for component carriers belonging to the corresponding component carrier group if all the component carriers belonging to the corresponding component carrier group have the same bandwidth and the entire of the bandwidth is not allocated.

The multi-control information may include resource allocation information for a component carrier allocated with the greatest bandwidth among all the component carriers if all the component carriers belonging to the corresponding component carrier group do not have the same bandwidth, and resource allocation information for the other component carriers may be determined using the resource allocation information of the component carrier allocated with the greatest bandwidth.

Resource allocation for the component carriers belonging to the component carrier group may be performed depending different resource allocation types.

The multi-control information may include information indicating which component carrier within the component carrier group is a scheduling target.

Also, the UE may perform bundling for ACK/NACK bits for the data information received through the component carriers belonging to the plurality of component carrier groups and transmit the bundled ACK/NACK bits through a specific resource (S1030). The specific resource may be related to an index of any one of the component carriers which are scheduling targets within the plurality of component carrier groups.

Although the embodiments according to the present invention have been described as above with reference to FIG. 10, the embodiment related to FIG. 10 may include at least a part of the aforementioned embodiment(s) alternatively or additionally.

Figure 11:
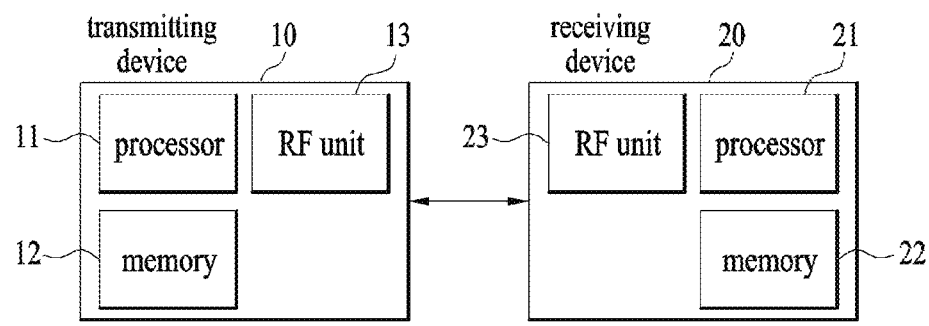
FIG. 11 is a block diagram illustrating an apparatus for implementing the embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a mobile terminal, relay, or base station.

The invention claimed is:

1. A method for receiving, by a terminal which has been configured with a plurality of component carrier groups, control information in a wireless communication system, the method comprising:
    receiving control information for the plurality of component carrier groups; and
    decoding data information through component carriers belonging to the plurality of component carrier groups based on the received control information,
    wherein the control information includes multi-control information for each of the plurality of component carrier groups, or single control information for component carriers included in each of the plurality of component carrier groups,
    wherein the multi-control information includes resource allocation information for a component carrier allocated with the largest bandwidth among all component carriers belonging to a corresponding component carrier group when all the component carriers belonging to the corresponding component carrier group do not have the same bandwidth, and
    wherein resource allocation information for the other component carriers belonging to the corresponding component carrier group is determined based on a portion of the resource allocation information of the component carrier allocated with the largest bandwidth.

2. The method according to claim 1, wherein the single control information includes at least one of transmission mode-dedicated single control information and transmission mode-common single control information of the terminal.

3. The method according to claim 1, wherein resource allocation for each component carrier belonging to the corresponding component carrier group is performed depending on a respective resource allocation type for the each component carrier.

4. The method according to claim 1, wherein the multi-control information includes information indicating which component carrier within the component carrier group is a target scheduled by the multi-control information.

5. The method according to claim 1, further comprising bundling for ACK/NACK bits for the data information received through component carriers belonging to the plurality of component carrier groups and transmitting the bundled ACK/NACK bits through a specific resource,
    wherein the specific resource is related to an index of one of the component carriers which are targets scheduled by the control information within the plurality of component carrier groups.

6. A terminal configured to receive control information in a wireless communication system, the terminal being configured with a plurality of component carrier groups, the terminal comprising:
    a transmitter and a receiver; and
    a processor configured to control the transmitter and the receiver,
    wherein the processor is configured to:
        receive control information for the plurality of component carrier groups, and
        decode data information through component carriers belonging to the plurality of component carrier groups based on the received control information,
    wherein the control information includes multi-control information for each of the plurality of component carrier groups, or single control information for component carriers included in each of the plurality of component carrier groups,
    wherein the multi-control information includes resource allocation information for a component carrier allocated with the largest bandwidth among all component carriers belonging to a corresponding component carrier group when all the component carriers belonging to the corresponding component carrier group do not have the same bandwidth, and
    wherein resource allocation information for the other component carriers belonging to the corresponding component carrier group is determined based on a portion of the resource allocation information of the component carrier allocated with the largest bandwidth.

7. The terminal according to claim 6, wherein the single control information includes at least one of transmission mode-dedicated single control information and transmission mode-common single control information of the terminal.

8. The terminal according to claim 6, wherein resource allocation for each component carrier belonging to the corresponding component carrier group is performed depending on a respective resource allocation type for the each component carrier.

9. The terminal according to claim 6, wherein the multi-control information includes information indicating which component carrier within the component carrier group is a target scheduled by the multi-control information.

10. The terminal according to claim 6, wherein the processor performs bundling for ACK/NACK bits for the data information received through component carriers belonging to the plurality of component carrier groups and transmits the bundled ACK/NACK bits through a specific resource, wherein the specific resource is related to an index of one of the component carriers which are targets scheduled by the control information within the plurality of component carrier groups.

* * * * *